United States Patent [19]

Fink

[11] 3,825,306
[45] July 23, 1974

[54] DIFFERENTIAL-LOCK TYPE DEVICE FOR A MOTOR VEHICLE

[75] Inventor: Werner Fink, Frankfurt/Main, Germany

[73] Assignee: ITT Industries, New York, N.Y.

[22] Filed: Mar. 19, 1973

[21] Appl. No.: 342,655

Related U.S. Application Data

[62] Division of Ser. No. 166,849, July 28, 1971, Pat. No. 3,771,839.

[30] Foreign Application Priority Data

Oct. 7, 1970    Germany.............................. 2049262

[52] U.S. Cl......... 303/21 BE, 180/82 R, 188/181 A, 303/21 F
[51] Int. Cl.............................................. B60t 8/12
[58] Field of Search............... 180/82 R; 188/181 A; 303/20, 21; 324/162; 340/262, 52 R

[56] References Cited
UNITED STATES PATENTS

| | | | |
|---|---|---|---|
| 3,498,683 | 3/1970 | Leiber............................. | 303/21 BE |
| 3,554,612 | 1/1971 | Harned........................... | 303/21 BE |
| 3,617,099 | 11/1971 | Sugiyama....................... | 303/21 EB |
| 3,622,973 | 11/1971 | Domann et al................. | 340/262 X |

*Primary Examiner*—Trygve M. Blix
*Assistant Examiner*—Stephen G. Kunin
*Attorney, Agent, or Firm*—John T. O'Halloran; Menotti J. Lombardi, Jr.; Alfred C. Hill

[57] ABSTRACT

There are disclosed arrangements combined with known anti-skid systems that will prevent spinning of one drive wheel while the other drive wheel is stationary due to differential gearing. This is accomplished by providing a threshold circuit responsive to excess acceleration of the spinning wheel, in addition to the normal acceleration threshold circuits of an anti-skid system, to cause brake pressure to be applied to the wheel brake cylinder of the spinning wheel. The additional threshold circuit is placed in operation by the vehicle driver.

9 Claims, 4 Drawing Figures

DIFFERENTIAL-LOCK TYPE DEVICE FOR A MOTOR VEHICLE

CROSS REFERENCE TO RELATED APPLICATIONS

This is a division of application Ser. No. 166,849 filed July 28, 1971, now U.S. Pat. No. 3,771,839.

BACKGROUND OF THE INVENTION

The invention relates to a device for locking the differential gearing of motor vehicles.

In motor vehicles, the differential gearing effects the transmission of the drive forces to the two rear axle shafts and the connection of these rear axle shafts with each other. It distributes the drive evenly to both drive wheels and at the same time it allows torque differences of the two drive wheels, such as during cornering.

In practice, when driving, situations may occur where the aforementioned effect of the differential gearing is undesired. This is the situation during starting, when – due to uneven loading or unequal ground friction coefficients – the greatest possible of one drive wheel is smaller than that of the other drive wheel which is greater than the drive force at the ground contact surface of the wheel. Since the torque is always distributed evenly to the two drive wheels, irrespective of the speed and acceleration conditions, the thrust transmitted from the wheels on to the axle can only correspond to the smaller of the two thrusts. The thrusts of the drive wheels will possibly then not be sufficient for starting. One drive wheel will then spin, its speed increasing, while the other drive wheel will stand still, not moving at all. In order to compensate for this disadvantageous effect of the differential gearing and hence for the spinning of the wheel positioned on slippery ground, it has in the past been the practice to provide a manually operable differential lock which, e.g., in the form of a displaceable claw coupling rigidly connects one rear axle with the differential housing. Thus, the effect of the differential gearing will be eliminated and the drive axle will be practically converted into a rigid shaft which can take up and transmit the full load of the drive force.

SUMMARY OF THE INVENTION

An object of the present invention is to provide a reliably working and improved device which is easily placed in operation by the driver and which will prevent the transmission of the full drive force on to only one drive wheel when starting.

Another object of the present invention is to prevent the wheel on to which, under the existing outside conditions, the entire torque would be transmitted from spinning when starting, its speed or rather its acceleration being excessive, by causing an almost even distribution of the torque to both drive wheels.

A feature of the present invention is the provision of a differential-lock type device for a motor vehicle comprising an axle including differential gearing for driving a pair of road wheels, a wheel brake cylinder coupled to each of the pair of wheels; an anti-skid system coupled to at least one of the pair of wheels; and an arrangement coupled to the anti-skid system responsive to acceleration of the one of the pair of wheels exceeding on acceleration threshold greater than an acceleration threshold normally employed in the anti-skid system to apply brake pressure to the wheel brake cylinder associated with the one of the pair of wheels.

According to the invention this is achieved by combining a device for the generation of braking pressure in the wheel brake cylinder in the event of excessive speed of the wheel with an anti-skid system known per se.

The sensor and electronic system of an anti-skid system known per se for noticing and indicating the state of acceleration of the wheel has coupled thereto an additional acceleration threshold circuit which will repond to a certain excessive acceleration threshold, the output signal of which act on the valves controlling the brake pressure in the wheel brake cylinder.

In an anti-skid system known per se which works with an input valve and an output valve according to the principle of taking brake pressure medium out of the brake line branch connected to the wheel cylinder, an accumulator is provided which is connected with the wheel brake cylinder via a pressure medium line and an addition valve connected in said pressure medium line which is normally closed. The threshold circuit responding to a certain excessive acceleration threshold acts either directly or indirectly via output amplifiers on both the input and additional valves, the input valve normally being open and connected in the brake circuit between the master cylinder and the wheel brake cylinder and the additional valve normally being closed and connected between the accumulator and the wheel brake cylinder.

The electric circuit in which the additional threshold circuit is connected is closed by means of a switch actuated by the driver. The additional threshold circuit is integrated into the electronic system of the anti-skid system, said electronic system also working with threshold circuits responding to acceleration and deceleration thresholds. A reaction of the individual threshold circuits one upon the other is avoided by arranging diodes at the points of intersection of their output circuits.

When the switch operated by the driver is closed and the acceleration threshold of the additional threshold circuit is transgressed, the input valve and the additional valve disposed between the accumulator and the wheel brake cylinder are brought into their switched positions when this acceleration threshold is transgressed anew — this time in the downward direction — both valves return into their normal positions.

In an anti-skid system working with a separating valve and a hydraulically controlled displacement piston according to the principle of volume expansion, the valves controlling the movement of the displacement piston are actuated by both the output signals of the threshold circuits of the anti-skid system and the output signal of the additional threshold circuit which responds to the excessive acceleration threshold.

The winding of a normally closed electromagnetic valve connected between an accumulator and the annular chamber of the displacement piston and the winding of a normally open electromagnetic valve connected between a reserve tank and the annular chamber of the displacement piston are disposed in series in an electric circuit which also includes therein a normally open driven actuated mechanical switch and an electrically controlled normally closed switch element.

The normally closed switch element is actuated by the output signal of the additional threshold circuit responding to the excessive acceleration threshold. When the mechanical switch is closed by the driver and the additional threshold circuit has not as yet responded, the two electromagnetic valves are brought into their switched positions and, thus, the displacement piston will come into a position by which the volume of the wheel brake circuit is expanded. When the additional threshold circuit responds, the electric circuit including the valve windings will be interrupted by means of the above mentioned switch element and the valves as well as the displacement piston will return to their initial positions, the braking pressure increasing.

The excessive acceleration threshold of the additional threshold circuit is preferably +1.0 g, where $g$ is equal to 32,1578 feet per second squared.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
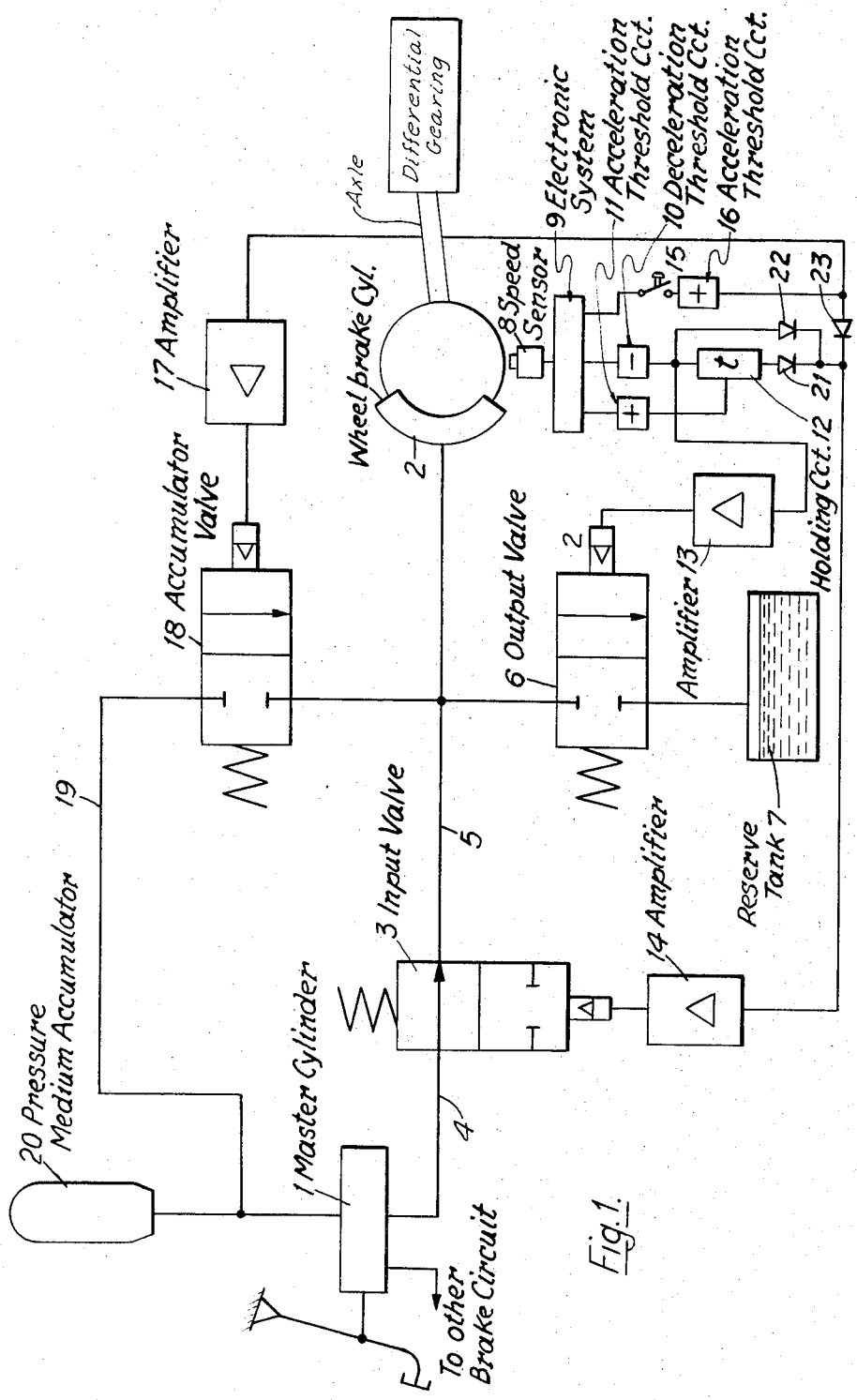
FIG. 1 illustrates a schematic diagram of a system according to the principles of the present invention which is suitable for use in vehicles equipped with anti-skid systems working according to the principle of taking pressure medium out of the brake line connected to the wheel brake cylinder.

For a better understanding of the invention the operation of the anti-skid system of FIG. 1, which in itself is known, is described with respect to one wheel. The pressure medium line between master cylinder 1 and wheel brake cylinder 2 is subdivided into two portions 4 and 5 by means of input valve 3 which is normally open. Portion 5 of the pressure medium line is connected with wheel brake cylinder 2 and — by means of a normally closed output valve 6 — with reserve tank 7 of the brake system. Speed sensor 8 and electronic system 9 connected in series provide electrical output signals proportional to the respective accelerations and decelerations of the wheel. Electronic system 9 is followed by two threshold circuits 10 and 11, a part of the anti-skid system, acting on holding circuit 12 and on final amplifiers 13 and 14 whose output signals provide the exciter current for the input valve 3 and the output valve 6 which are to be electromagnetically actuated. The wheel transgressing a certain critical deceleration threshold during braking and, thus, evoking the danger of being locked, threshold circuit 10 will respond and deliver an output signal which will close input valve 3 via final amplifier 14 and which will open output valve 6 via final amplifier 13. At the same time a holding circuit 12 will be loaded up and brought into its operating position, said holding circit 12 being connected in parallel to the connection line leading to final amplifier 14. Input and output valves 3 and 6 having adopted their switched positions, the hydraulic pressure in section 5 of the pressure medium line connected with wheel brake cylinder 2 will be reduced by drawing pressure medium off into reserve tank 7 and the wheel will be re-accelerated. The wheel exceeding the above mentioned deceleration threshold, the exciter current supplied to output valve 6 will be interrupted such that output valve 6 will close while input valve 3 will remain closed due to the action of holding circuit 12 until threshold circuit 11 responds to a certain acceleration threshold, preferably to a re-acceleration maximum, holding circuit 12 then being extinguished by the output signal of circuit 11. Then input valve 3 will also return to its initial position and reconnect master cylinder 1 and wheel brake cylinder 2 for a new braking process.

The invention utilizes several constructional elements of the anti-skid system for a device which will perform the duty of a differential lock. It is the purpose of this invention to avoid the excessive acceleration of one wheel while the other wheel of the same (thrust) axle stands still and to, thus, facilitate the starting of the vehicle.

For this purpose, it is possible to connect an additional threshold circuit 16 in series with electronic system 9 by actuating push button 15, said circuit 16 responding to a certain acceleration value greater than the acceleration value of the threshold of circuit 11. The output signal of circuit 16 is coupled to final amplifier 17 which provides the exciter current for an accumulator valve 18 which is electromagnetically actuated. Valve 18 is connected in pressure medium line 19 which connects pressure medium accumulator 20 with wheel brake cylinder 2. When in its rest position, valve 18 is closed. Furthermore, the output signal of circuit 16 acts on final amplifier 14 which operates input valve 3. The diodes 21, 22 and 23 positioned in front of the point of intersection of the current feeder lines of threshold circuits 10 and 16 and holding member 12 prevent a reaction of the individual circuits one on the other.

Figure 2:
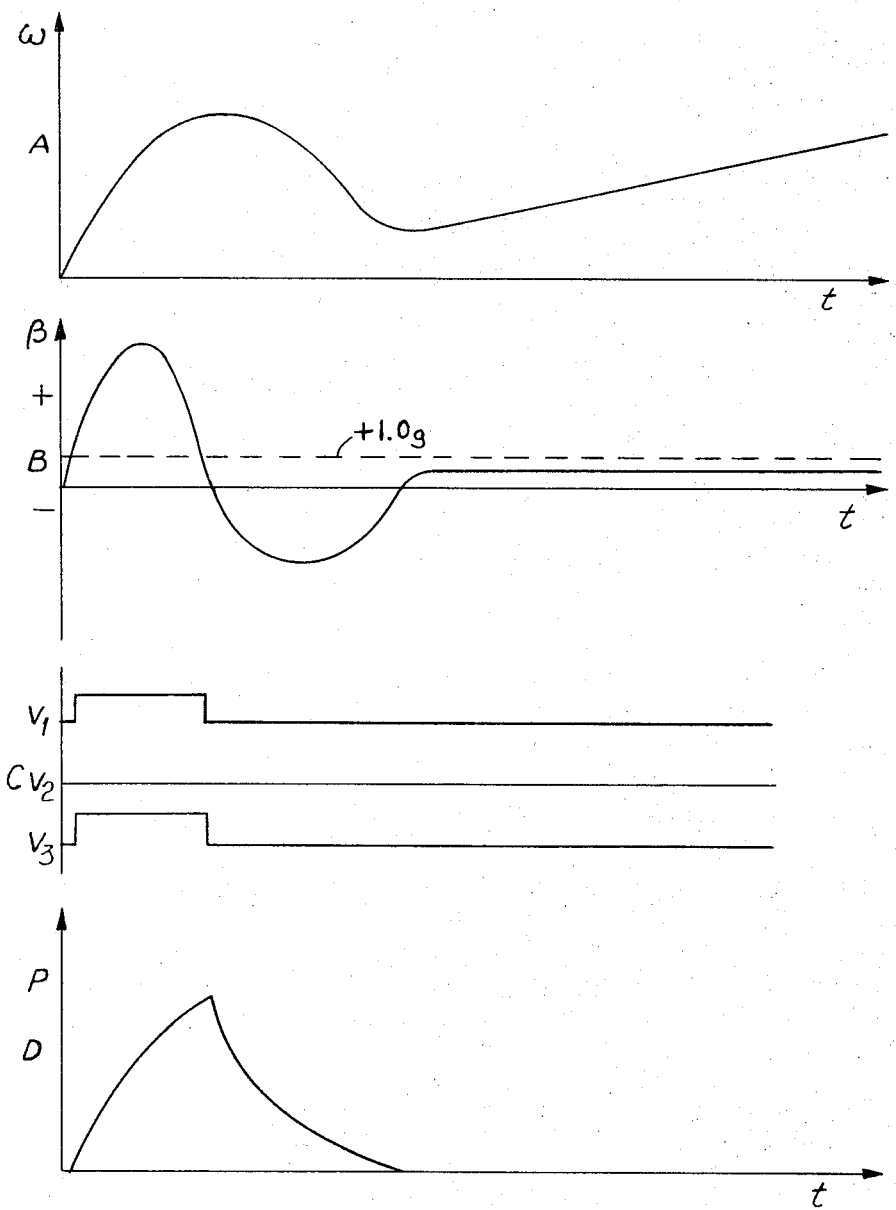
FIG. 2 illustrates curves useful in explaining the operation of the inventive system of FIG. 1.

The curves of FIG. 2 illustrate the operation of the above-described system of FIG. 1. As seen from above they show:

In Curve A, the path of the speed $\omega$ of a wheel during starting, the inventive device being used;

In Curve B, the path of acceleration $\dot{\omega}$ of the same wheel;

In Curves C, the switching operations of the three valves $V_1$ = input valve 3

$V_2$ = output valve 6

$V_3$ = valve 18 during starting, the inventive device being used;

In Curve D, the pressure characteristic $p$ of the pressure in the wheel brake cylinder.

In case the driver wants the action of a differential lock he will close a swtich by actuating push button 15, said switch keeping the system connected for operation as long as it is closed. If there occurs an acceleration of the wheel which exceeds + 1.0 g (FIG. 2, Curve B), threshold circuit 16 will respond and the windings of input valve 3 and valve 18 will be supplied with electric current via their final amplifiers 14 and 17. Input valve 3 will close and separate wheel brake cylinder 2 from master cylinder 1, while valve 18 will open such that the pressure from accumulator 20 will pass through pressure medium line 19 into wheel brake cylinder 2.

The brakes will be applied and the wheel will be braked until the acceleration decreases to a value less than + 1.0 g. Threshold circuit 16 then will return into its rest position and the excitation current for valves 3 and 18 will be interrupted and these valves will return to their initial positions. Accumulator 20 will be separated from wheel brake cylinder 2 and the pressure existing in wheel brake cylinder 2 and in portion 5 of the pressure medium line will diminish and pass through input valve 3 and master cylinder 1 and will escape into reserve tank 7. This procedure may be repeated several times until the vehicle has reached a certain speed then the switch of push button 15 will be opened.

Figure 3:
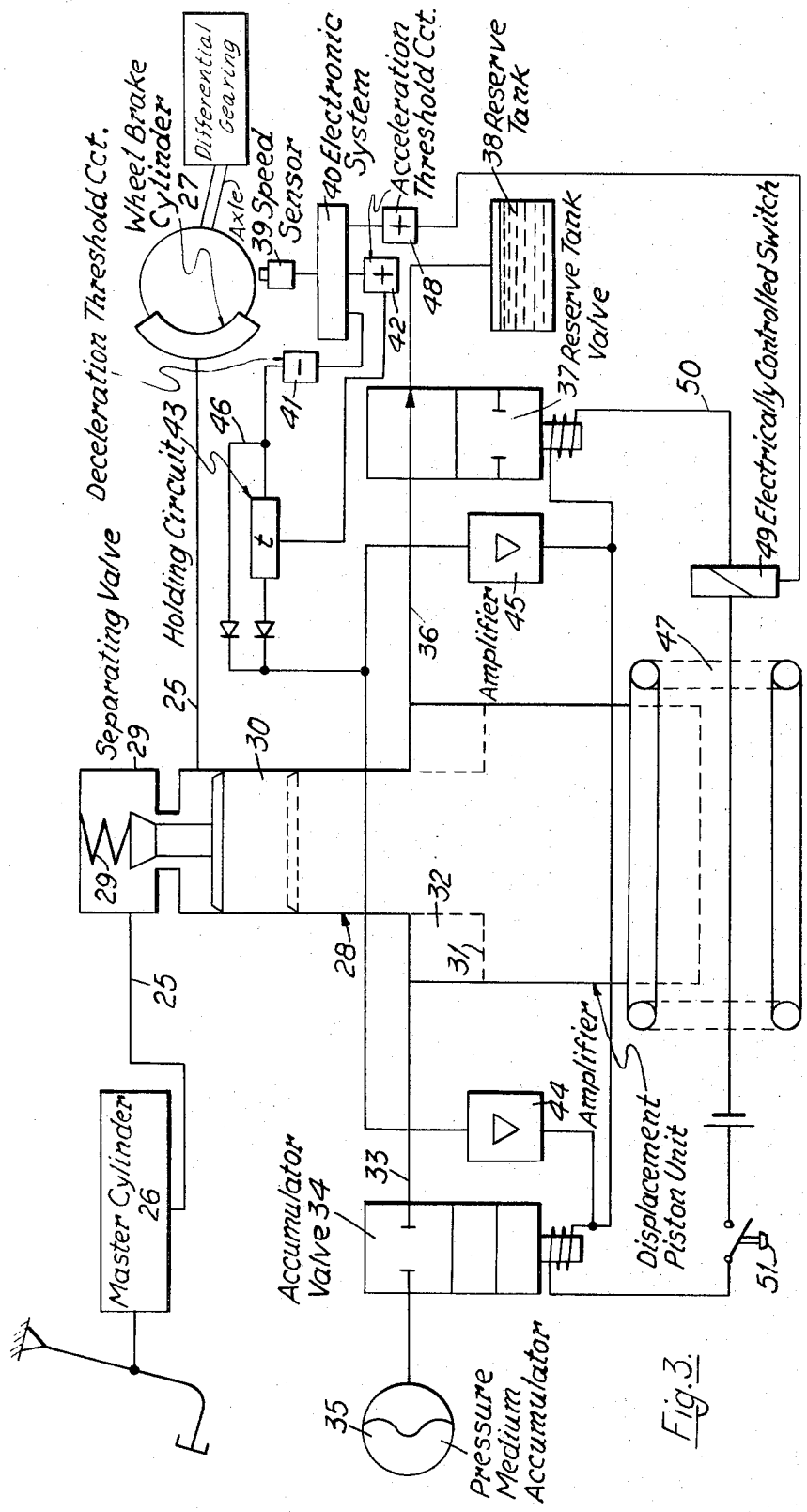
FIG. 3 illustrates a schematic drawing of a system according to the principles of the present invention for use in vehicles equipped with anti-skid systems working according to the principle of volume expansion.

FIG. 3 shows a differential-lock type or anti-spin device of the present invention in combination with a known anti-skid system working according to the principle of volume expansion. For a better understanding of the present invention the operation of this type of anti-skid system will also be breifly described.

In pressure medium line 25 between master cylinder 26 and wheel brake cylinder 27, displacement piston unit 28 and separating valve 29, formed as one coacting unit, are connected. The displacement piston 30 is provided with an annular surface 31 which is formed by means of a step. The annular chamber 32 of the displacement piston unit 28 formed by the annular surface 31, on one hand, is connected with pressure medium accumulator 35 by means of pressure medium line 33 and accumulator valve 34 which in its rest position is closed. On the other hand, chamber 32 is connected with reserve tank 38 of the brake system by means of pressure medium line 36 and reserve tank valve 37 which in its rest position is opened. Here, also sensor 39 and electronic system 40 connected in series will generate electric signals proportional to the accelerations and decelerations of the wheel. Threshold circuits 41 and 42, a part of the anti-skid system, act on two final amplifiers 44 and 45 via holding circuit 43, said final amplifiers 44 and 45 actuating valves 34 and 37. Holding member 43 in the circuit between threshold circuit 41, responding to a given deceleration threshold, and final amplifiers 44 and 45 is bridged by means of a one-way connection 46. When the wheel transgresses a certain deceleration threshold, threshold circuit 41 will respond and supply a signal to amplifiers 44 and 45 via one-way connection 46. At the same time holding member 43 which is connected in parallel to connection 46 is loaded up. The excitation current supplied by final amplifiers 44 and 45 operates valves 34 and 37. Valve 37 closes and separates annular chamber 32 from reverse tank 38 while valve 34 opens and connects accumulator 35 to annular chamber 32. The accumulator pressure now acting on annular surface 31 moves displacement piston 30 against the force of pressure spring 47. Separating valve 29 closes and interrupts the pressure medium line between master cylinder 26 and wheel brake cylinder 27 while the movement of separating piston 30 causes the pressure in the portion of the brake circuit communicating with the wheel brake cylinder to diminish and, hence, permit reacceleration of the wheel. When the wheel speed is above the abovementioned deceleration threshold, threshold circuit 41 will return to its initial position and valves 34 and 37 will be held in their switched positions by means of the energy accumulated in holding circuit 43 until threshold circuit 42 responds to a certain acceleration threshold, preferably to the maximum of reacceleration, to provide an output signal which will extinguish holding circuit 43. The excitation current then will be interrupted and the entire system will return to its intital position.

In order to provide the differential-lock type device in accordance with the principles of the present invention electronic system 40 is followed by an additional threshold circuit 48 which responds to an exactly determined acceleration threshold. An output signal when this acceleration threshold is exceeded and acts on electrically controlled switch element 49 which normally is switched for passage of current and which is connected in current circuit 50. Current circuit 50 is closed by the driver by actuating push button 51, the windings of the two electromagnetic valves 34 and 37 being connected in series in said current circuit.

Figure 4:
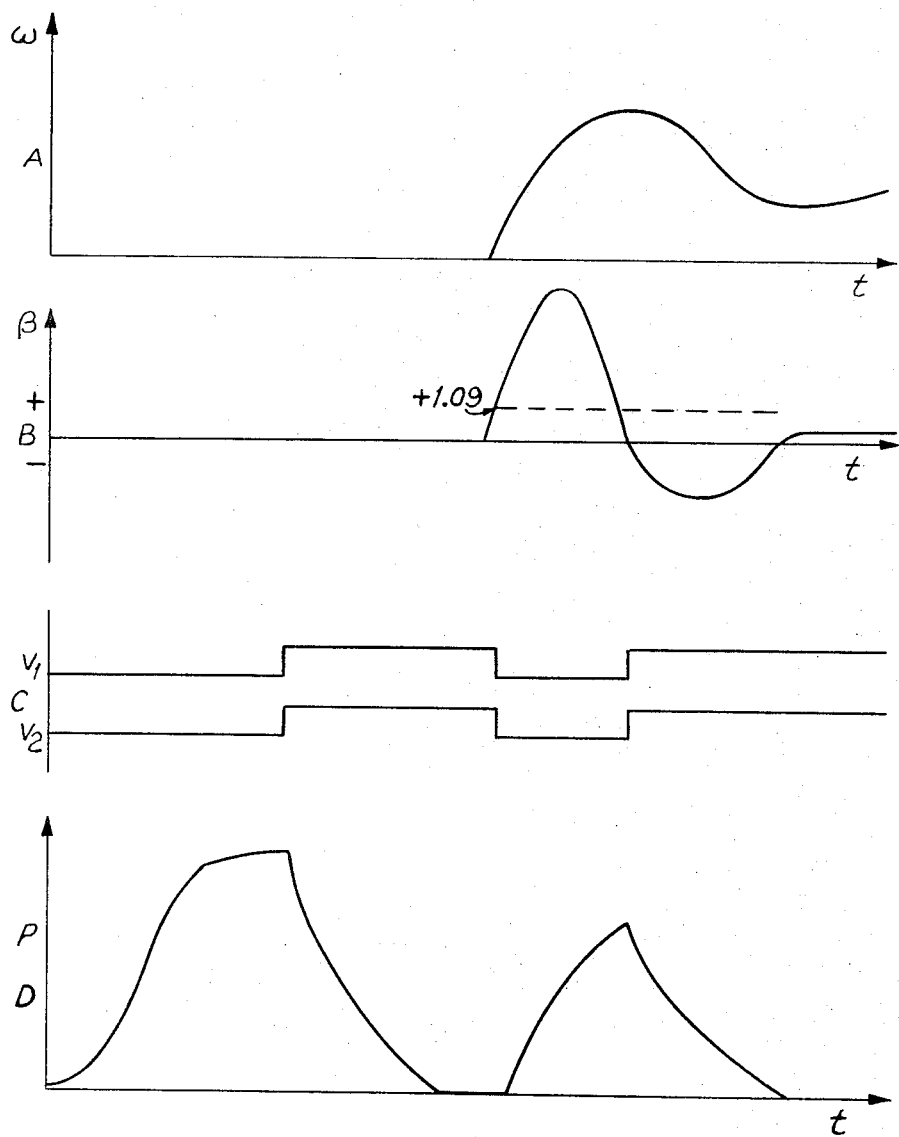
FIG. 4 illustrates curves useful in explaining the operation of the inventive system of FIG. 3.

The curves of FIG. 4 illustrate the operation of the inventive system of FIG. 3 and show:

In Curve A, the path of the speed $\omega$ of the wheel during starting, the inventive device being used;

In Curve B, the path of acceleration $\beta$ of the same wheel;

In Curves C, the switching operations of the valves $V_1$ = accumulator valve 34

$V_2$ = reserve tank valve 37; and

In Curve D, the pressure characteristic $p$ of the pressure in the wheel brake cylinder during starting.

When starting the driver will actuate the brake pedal and keep his foot on it. He then actuates push button 51 so as to close the associated switch and, hence, electric circuit 50. Valves 34 and 37 will be brought into their switched positions and displacement piston 30 will move to the position shown by the dotted lines in FIG. 3, the brake pressure in brake circuit 25 decreasing to zero. If there then occurs an acceleration at the wheel during starting which surpasses + 1.0 g (Curve B, FIG. 4), threshold circuit 48 will respond and interrupt electric circuit 50 by means of switch element 49. Both valves 34 and 37 and, hence, displacement piston 30 will return to their normal positions while separating valve 29 opens and reestablishes the connection between master cylinder 26 and wheel brake cylinder 27. The brake pressure building up brakes the wheel. The wheel coming below the acceleration threshold of + 1.0 g, the output signal of threshold circuit 48 will be extinguished, electric circuit 50 will be closed by switch element 49 and valves 34 and 37 will return to their switched positions with an accompanying decrease in the brake pressure. This procedure may be repeated several times. After having started successfully the driver will take his foot off the brake pedal and release push button 51.

The invention enables a vehicle to be equipped with a device having the effect of a differential lock by only adding a few constructional parts to an anti-skid system already provided. In contrast to the known mechanical devices, this device due to the respective acceleration of the wheel works more accurately and automatically adapts to the existing ground friction coefficients.

By minor changes, the described principle may find application in combination with any anti-skid system without changing the basic idea of the invention.

While I have described above the principles of my invention in connection with specific apparatus it is to be more clearly understood that this description is made only by way of example and not as a limitation to the

I claim:

1. A differential-lock type device for a motor vehicle comprising:
   an axle including differential gearing for driving a pair of road wheels;
   a wheel brake cylinder coupled to each of said pair of wheels; an anti-skid system coupled to at least one of said pair of wheels; and
   an arrangement coupled to said anti-skid system responsive to acceleration of said one of said pair of wheels exceeding an acceleration threshold greater than all acceleration thresholds normally employed in said anti-skid system to apply brake pressure to said wheel brake cylinder associated with said one of said pair of wheels to prevent spinning of said one of said pair of wheels;
   said arrangement being activated by a driver of said motor vehicle to cause said arrangement to be responsive to said acceleration exceeding said acceleration threshold greater than said acceleration thresholds normally employed in said anti-skid system; and
   said anti-skid system including
      a master cylinder,
      a hydraulic brake pressure medium accumulator,
      a hydraulic brake pressure medium reserve tank,
      a combined separating valve and a hydraulically controlled displacement piston, said separating valve normally connecting said master cylinder to said wheel brake cylinder of said one of said pair of wheels,
      a first normally open electromagnetic valve connecting said accumulator to said displacement piston,
      a second normally closed electromagnetic valve connecting said displacement piston to said reserve tank, and
      first electronic circuitry coupled to said one of said pair of wheels and said first and second valves to produce usual anti-skid control signals in response to the value of a wheel acceleration signal relative to a first acceleration threshold and a deceleration threshold, said anti-skid control signals controlling said first and second valves and, hence, said combined separating valve and displacement piston to prevent the skidding of said one of said pair of wheels.

2. A device according to claim 1, wherein
said arrangement includes
   a solenoid winding for each of said first and second valves,
   an electric circuit interconnecting said windings, and
   second electronic circuitry coupled to said first electronic circuitry and said electric circuit to produce a spinning control signal when the value of said wheel acceleration signal exceeds a second acceleration threshold greater than said first acceleration threshold, said spinning control signal controlling the current flow in said electric circuit to control the operation of said first and second valves and, hence. said combined separating valve and displacement piston to prevent the spinning of said one of said pair of wheels.

3. A device according to claim 2, wherein said arrangement is activated by a driver of said motor vehicle closing a switch connected in said electric circuit.

4. A device according to claim 2, wherein
said electric circuit includes
   both of said solenoid windings,
   a source of voltage,
   a normally open mechanical switch, and
   a normally closed electrically controlled switch,
   said windings, said source and said swtich being connected in a series circuit; and said second electronic circuitry includes
   a first threshold circuit having said second acceleration threshold and its output coupled to said electrically controlled switch to control the current flow in said electric circuit, said first threshold circuit being coupled to said first electronic circuitry to respond to said wheel acceleration signal.

5. A device according to claim 4, wherein
said first electronic circuitry, includes
   first means coupled to said one of said pair of wheels to produce said wheel acceleration signal,
   a second threshold circuit having said deceleration threshold coupled to said first means to produce one of said anti-skid control signals when said acceleration signal is less than said deceleration threshold, said one of said anti-skid control signals activating both said first and second valves to their switched position, namely, to open said first valve and to close said second valve, to actuate said combined separating valve and displacement piston to prevent the skidding of said one of said pair of wheels,
   a holding circuit coupled to said second circuit to maintain said first and second valves in their switch position, and
   a third threshold circuit having said first acceleration threshold coupled to said first means and said holding circuit to produce another of said anti-skid control signals when said acceleration signal is greater than said first acceleration threshold, said another of said anti-skid control signals deactivating said holding circuit and thereby return said first and second valves and said combined separating valve and displacement piston to their normal position.

6. A device according to claim 5, wherein
said first circuit is coupled to said first means.

7. A device according to claim 6, wherein
said arrangement is activated by a driver of said motor vehicle closing said mechanical switch.

8. A device according to claim 7, wherein
when said mechanical switch is closed prior to said first threshold circuit producing said spinning control signal said first and second valves are changed to said switched position to move said combined separating valve and displacement piston to interrupt the connection between said master cylinder and said wheel brake cylinder and expand the volume of a pressure medium connection to said wheel brake cylinder, and
after said first threshold circuit produces said spinning control signal the current flow in said electric circuit is interrupted by said electrically controlled switch, said first and second valves return to their normal position and said combined separating valves and displacement piston returns to its normal position to reconnect said wheel brake cylinder to said master cylinder and apply brake pressure to said wheel brake cylinder due to said driver actuating said master cylinder.

9. A device according to claim 8, wherein
said second acceleration threshold is equal to +1.0 g, where g is equal to 32.1578 feet per second squared.

* * * * *